US008337653B2

(12) United States Patent
Menz

(10) Patent No.: US 8,337,653 B2
(45) Date of Patent: Dec. 25, 2012

(54) METHOD FOR THE INDIVIDUAL APPLICATION OF HOT EMBOSSING FILM AND SECURITY DOCUMENTS PRODUCED THEREWITH

(76) Inventor: Irina Menz, Grasbrunn (DE)

( * ) Notice: Subject to any disclaimer, the term of this patent is extended or adjusted under 35 U.S.C. 154(b) by 38 days.

(21) Appl. No.: 12/867,996

(22) PCT Filed: Feb. 18, 2009

(86) PCT No.: PCT/DE2009/000219
§ 371 (c)(1),
(2), (4) Date: Aug. 17, 2010

(87) PCT Pub. No.: WO2009/103274
PCT Pub. Date: Aug. 27, 2009

(65) Prior Publication Data

US 2010/0323131 A1 Dec. 23, 2010

(30) Foreign Application Priority Data

Feb. 18, 2008 (DE) ........................ 10 2008 009 699

(51) Int. Cl.

| | |
|---|---|
| ***B44C 1/17*** | (2006.01) |
| ***B29C 65/52*** | (2006.01) |
| ***B32B 37/26*** | (2006.01) |
| ***B32B 38/10*** | (2006.01) |
| ***B32B 38/14*** | (2006.01) |
| ***B32B 7/14*** | (2006.01) |

(52) U.S. Cl. ........ 156/234; 156/240; 156/241; 156/247; 156/277; 156/291

(58) Field of Classification Search .................. 156/230, 156/234, 235, 240, 241, 257, 277, 281, 289, 156/291
See application file for complete search history.

(56) References Cited

U.S. PATENT DOCUMENTS

| | | | | | |
|---|---|---|---|---|---|
| 4,012,552 | A | * | 3/1977 | Watts | 428/200 |
| 4,383,878 | A | * | 5/1983 | Young et al. | 156/235 |
| 4,921,319 | A | * | 5/1990 | Mallik | 359/1 |
| 5,128,779 | A | * | 7/1992 | Mallik | 359/2 |
| 5,145,212 | A | * | 9/1992 | Mallik | 283/86 |
| 5,344,808 | A | * | 9/1994 | Watanabe et al. | 503/227 |
| 5,410,642 | A | * | 4/1995 | Hakamatsuka et al. | 358/1.14 |
| 5,411,296 | A | * | 5/1995 | Mallik | 283/86 |
| 5,510,171 | A | * | 4/1996 | Faykish | 428/32.62 |

(Continued)

FOREIGN PATENT DOCUMENTS

EP 0341047 B 11/1989

(Continued)

OTHER PUBLICATIONS

English Abstract of FR 2,277,672.*

*Primary Examiner* — Sing P Chan
(74) *Attorney, Agent, or Firm* — Lisa V. Mueller; Michael Best & Friedrich LLP

(57) ABSTRACT

The invention relates to a method for the individual application of a hot embossing film, according to which an adhesive is printed on a substrate in the form of symbols, patterns, numbers etc., then a hot embossing film consisting of a backing film, peel-off layer and decorative layer is hot-laminated on the printed substrate and the backing film is removed.

10 Claims, 1 Drawing Sheet

U.S. PATENT DOCUMENTS

Figure 1:
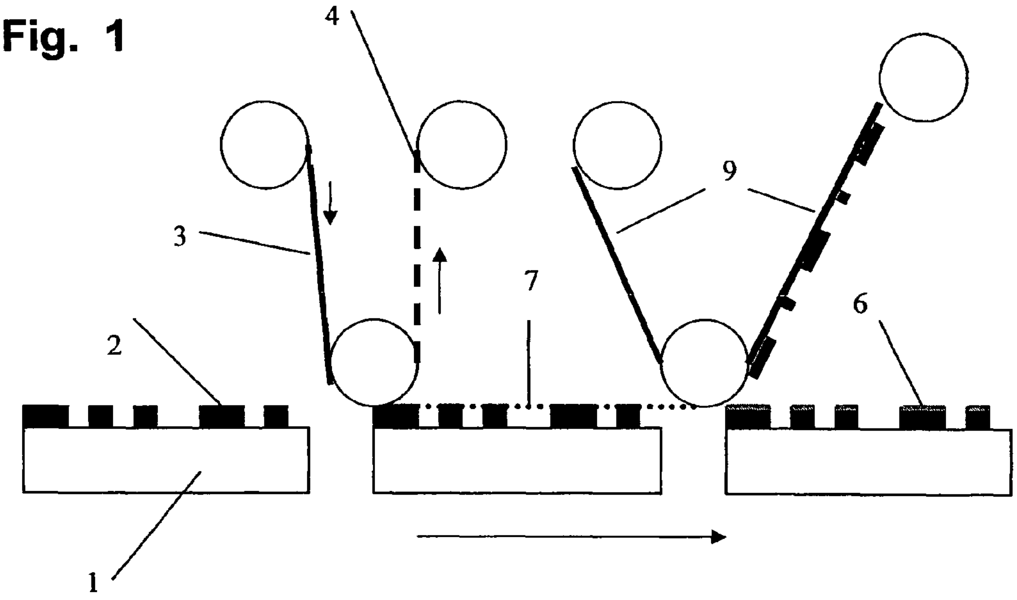

| | | | | |
|---|---|---|---|---|
| 5,629,093 | A * | 5/1997 | Bischof et al. | 428/411.1 |
| 5,658,411 | A * | 8/1997 | Faykish | 156/233 |
| 5,683,774 | A * | 11/1997 | Faykish et al. | 428/40.1 |
| 6,030,474 | A * | 2/2000 | Isono et al. | 156/64 |
| 6,060,157 | A * | 5/2000 | LaPerre et al. | 428/325 |
| 6,180,228 | B1 * | 1/2001 | Mueller et al. | 428/354 |
| 6,284,337 | B1 * | 9/2001 | Lorimor et al. | 428/40.1 |
| 6,479,142 | B1 * | 11/2002 | Condon et al. | 428/354 |
| 6,954,293 | B2 | 10/2005 | Heckenkamp et al. | |
| 7,156,945 | B2 * | 1/2007 | Chaug et al. | 156/701 |
| 7,205,046 | B2 * | 4/2007 | Kobayashi et al. | 428/343 |
| 7,238,644 | B2 * | 7/2007 | Yukawa et al. | 503/227 |
| 7,261,920 | B2 * | 8/2007 | Haubrich et al. | 427/259 |
| 7,329,400 | B2 * | 2/2008 | Cisar et al. | 424/1.49 |
| 7,364,785 | B1 * | 4/2008 | Kim | 428/156 |
| 7,385,723 | B2 * | 6/2008 | Kawano et al. | 358/1.16 |
| 7,579,130 | B2 * | 8/2009 | Kobayashi et al. | 430/125.3 |
| 7,648,573 | B2 | 1/2010 | Rodler et al. | |
| 7,820,269 | B2 * | 10/2010 | Staub et al. | 428/156 |
| 7,820,272 | B2 * | 10/2010 | Torikoshi et al. | 428/195.1 |
| 7,972,472 | B2 * | 7/2011 | Chaug et al. | 156/701 |
| 2002/0163179 | A1 * | 11/2002 | Dubner et al. | 283/72 |
| 2003/0035917 | A1 * | 2/2003 | Hyman | 428/67 |
| 2003/0224169 | A1 * | 12/2003 | Kobayashi et al. | 428/408 |
| 2004/0029030 | A1 * | 2/2004 | Murray | 430/130 |
| 2005/0148469 | A1 * | 7/2005 | Yukawa et al. | 503/227 |
| 2005/0167035 | A1 * | 8/2005 | Laskey et al. | 156/230 |
| 2005/0213137 | A1 * | 9/2005 | Kawano et al. | 358/1.14 |
| 2006/0216497 | A1 * | 9/2006 | Torikoshi et al. | 428/323 |
| 2007/0031650 | A1 * | 2/2007 | Kobayashi et al. | 428/323 |
| 2008/0224462 | A1 * | 9/2008 | Dubner et al. | 283/75 |
| 2008/0236732 | A1 * | 10/2008 | Schmitt-Lewen | 156/230 |
| 2009/0061159 | A1 * | 3/2009 | Staub et al. | 428/161 |
| 2010/0108874 | A1 * | 5/2010 | Zahedi | 250/271 |
| 2012/0003346 | A1 * | 1/2012 | Chigono et al. | 425/363 |

FOREIGN PATENT DOCUMENTS

| | | | |
|---|---|---|---|
| EP | 0420026 | B1 | 4/1991 |
| EP | 0420261 | | 6/1991 |
| EP | 0433575 | A | 6/1991 |
| EP | 0896260 | A2 | 2/1999 |
| FR | 2277672 | A * | 3/1976 |
| WO | 2004041546 | A | 5/2004 |
| WO | 2006048563 | | 5/2006 |
| WO | 2006084686 | A | 8/2006 |

* cited by examiner

METHOD FOR THE INDIVIDUAL APPLICATION OF HOT EMBOSSING FILM AND SECURITY DOCUMENTS PRODUCED THEREWITH

CROSS-REFERENCE TO RELATED APPLICATIONS

This is the U.S. national stage of International Patent Application No. PCT/DE2009/000219, filed on Feb. 18, 2009, which claims priority to German patent application no. 10 2008 009 699 7, filed on Feb. 18, 2008, the contents of all of which are hereby incorporated by reference.

The invention relates to a method for the individual application of hot embossing film according to the preamble of claim 1 and security documents produced therewith according to claim 10.

The application of holographic hot embossing film on credit cards and personal documents has long been proving successful in increasing the protection against fraud and copying. Normally, these hot embossing films consist of a backing film, a peel-off layer, a thermoplast layer into which relief structures are embossed, a reflection layer and an adhesive layer which can be activated by heat. By means of a hot-embossing die, only the film portions corresponding to the contour of the hot-embossing die are transferred to the substrate with a heat-activated adhesive. The other film portions remain on the backing film and are removed from the substrate with the same. The hot embossing film can also be applied on the entire surface of the credit card if the hot embossing die has the shape of a credit card (DE 100 13 410 A1).

The holographic structures of the hot embossing film are produced by means of a holographic embossing template by replicating embossing into the thermoplast layer. In this manner, a hot embossing film with repetitive holographic motifs, called standard motifs, is obtained. For better protection against fraud of personal documents, it is increasingly desired to have individual personal data also in the applied holographic optical elements which can be visually compared with the printed personal data during the checking of the authenticity of the document. Volume hologram film overlays with a holographic passport photograph are known (EP 0 896 260 A2) to be used for document protection. However, the production and material costs for volume holograms are much higher than for hot embossing film with holographic relief structures.

The production of individual information in holographic relief structures embossed in film requires additional steps. The patent document EP 0 420 261 B1 lists various methods for this purpose. For instance, individual alterations of the structure of the hot embossing film can be performed, such as the printing of individual data on the reflection layer, followed by coating with adhesive layer, demetallization or alteration of the reflective properties of portions of the reflection layer, individual laser engraving of the embossed layer of thermal lacquer layer or partial adhesive coating in the form of individual data. These additional steps substantially increase the production effort, and the hologram film carrying personal data in this manner requires additional security efforts in intermediate storage until application on the document takes place. Additionally, material aging and mechanical damages, especially in the area of the adhesive layer applied in the form of individual personal data, can have severe effects on the quality of subsequent application. WO 2006/048563 proposes the use of a peel-off foil which deactivates the transferability of certain film portions of a hot embossing film coated with an adhesive. This peel-off foil is, for instance, laminated onto the hot embossing film; a heated die is pressed onto the film stack; the adhesive is activated only in this place so that during subsequent removal of the peel-off foil, the decorative layer having the contour of the die is separated from the backing film of the hot embossing film and remains on the peel-off foil. Now hot lamination of the hot embossing foil altered in this manner onto the document takes place. The peel-off foil can thus be removed immediately before application of the hot embossing film onto the document, preventing damage of the film surface during intermediate storage. With this method, however, delicate contours such as passport photographs cannot be applied on the document since film dust is known to form due to separation of these two films from each other, which dust can accumulate on the adhesive which can be activated thermally, thus impairing subsequent adhesive bonding to the document surface.

It is known from DE 35 11 146 A1 that hot embossing film can be partially applied on substrates if previously only certain substrate areas have been coated with adhesive which can be activated by heat. The hot embossing film itself has no adhesive coating and application takes place only where the adhesive is located on the substrate. If, for instance, adhesive is applied on a document of value as a strip, a strip of hot embossing film can be applied on the document of value (DE 102 22 433 A1). Printing colors which become sticky at a higher temperature can be used as adhesives as well. This opens up possibilities for an individual film application without the necessity of time-consuming retooling of the embossing die. Thus, writing with changing information content, numbering etc. can be rapidly and inexpensively applied from the hot embossing film to substrate surfaces. It has not been possible up to now to apply highly complex motifs, such as passport photographs, directly on the document individually from diffractive hot embossing film. In particular, the film application of passport pictures requires a very high application quality for making the picture easily to recognizable.

It is true that EP 0 420 026 B1 describes how passport photographs can be individually applied in the diffractive hot embossing film by partial demetallization of the metallized embossing layer in the form of the personal data afterwards, before it is applied on the respective documents. However, it is a drawback, in addition to the costly demetallization, that sophisticated data logistics are necessary for a correct allocation of the document to the individual hot embossing film.

DE 199 27 175 A1 describes how the application quality of a hot embossing film applied at high pressure by means of a hot embossing die can be improved if afterwards an adhesive tape is rolled over the substrate surface which tape removes adhering film residues from the substrate surface, wood or leather in this case. In this method, however, the hot embossing film is embossed deeply into the substrate and is therefore no longer located on the surface of the substrate so that the adhesive tape does not touch the applied film and there is no danger of the latter being drawn off the substrate.

Therefore it is the object of the invention to propose a method of the type mentioned above which allows individually and in good quality the inexpensive and safe application of passport photographs with the personal data from holographic hot embossing films on personal documents so as to better protect the personal data against fraud.

This object is solved by a method with the features of claim 1 and by a security document according to claim 10. Advantageous embodiments are indicated in the dependent claims which correspondingly refer back to them.

In the following, the invention is described in more detail by means of embodiments with reference to the figures.

Figure 2:
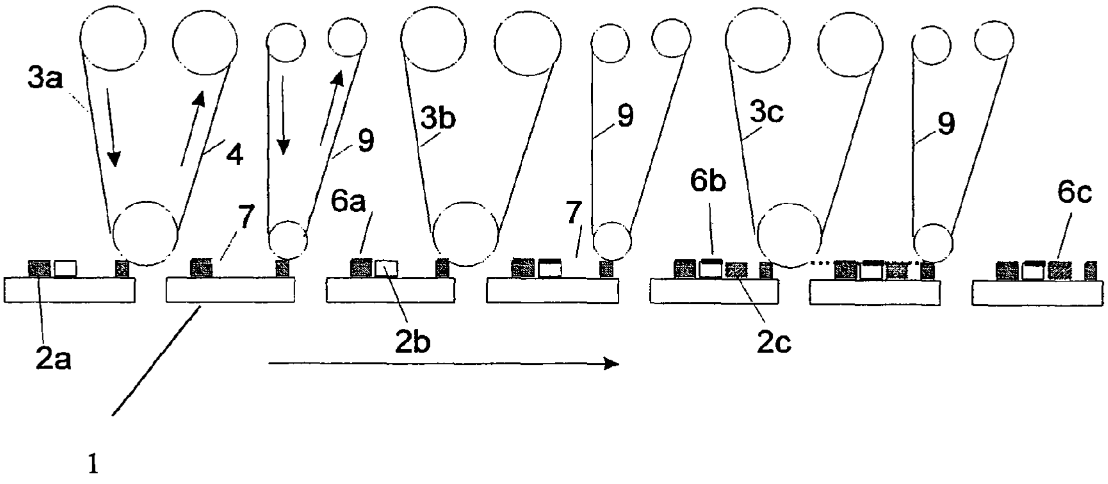

FIG. 1 shows the schematic structure of a device for performing the method in a first embodiment with black-and-white printing, and FIG. 2 shows the schematic structure of a device for performing the method in a second embodiment with color printing.

As can be seen in FIG. 1, first a monochrome additional passport photograph 2 is printed on a document 1, e. g. a plastic card or a paper sheet of a passport, on which all printed personal data may already be located, by thermal transfer printing as an inverse image, with a resolution of at least 200 DPI. Then a holographic hot embossing film 3 with no adhesive coating, consisting of a backing film 4, a peel-off layer 5, the holographically embossed thermal layer with the vapor deposited reflection layer, called here decorative layer 6, is laminated onto the printed document 1 with a roller hot lamination device at a temperature of 110-150° C. with the reflection layer side, and the backing film 4 of the hot embossing film is removed. The decorative layer 6 of the hot embossing film 3 remains as a contiguous layer where the printed passport photograph 2 is located. The face cannot be recognized since there are film residues 7 between the printed pixels in the face area as well. Both the optimization of the application temperature and the use of films with different peel-off properties do not led to a sufficient improvement of the quality of the details applied by film. Thus, films with a lower share of wax in the peel-off layer 5 between the backing film and the embossing layer were tested, which require separation forces of >12N for the application, with the result that the printed color did not sufficiently bind the decorative layer 6 and therefore the film transfer to the printed surface areas could not take place.

Films with a high share of wax release in the peel-off layer can already be applied at lower temperatures and with lower removal force <10N/cm. However, the passport photograph is not applied true to detail with this type of film, either. With this type of film, the decorative metal layer 6 within the passport picture area remains as a contiguous unstructured surface.

Since also the adhesive properties of the printing colors have a strong influence on the application quality of the hot embossing films, the printing colors and toners employed were varied. Colors suitable for printing on the document had to be found, which colors develop a sufficiently high adhesive force during hot embossing film application at temperatures between 110° and 150° C. after the printing process, but which nevertheless remain dimensionally stable on the document surface. Toners 8, preferably such that have been printed onto the document by laser printing or laser transfer printing, yielded the best hot film application results. For instance, fonts and numbers with font sizes >2 mm could be well applied. However, an acceptable film application of a passport photograph could not be achieved with these toners, either.

According to the invention, this problem of application quality has been solved by introduction of an additional method step after hot lamination of the film 3 and removal of the backing film 4 by rolling an adhesive film 9 with adhesive forces <10 N/cm, preferably <5 N/cm, over the photograph and during this process removing all those film residues 7 from the document surface underneath which there are no printed toner pixels (FIG. 1). In this manner, an absolutely clean film application 3' is achieved which renders the passport photograph in very good quality. If, however, adhesive films with greater adhesive force are used, the film portions adhering to the toner pixels are removed as well.

It is particularly advantageous to print the inverse passport photograph with transparent toners and to use a transparent diffractive hot embossing film with a highly diffractive transparent coating, e. g. titanium oxide, instead of the common metallic coating. In this manner, no other document data are covered.

To increase adjustability, it is proposed to first print a rectangular surface of the size of the passport picture on which a hot embossing film with a diffractive, preferably a "zero order" grid is applied, then to print the photograph and to apply another diffractive film with a different grid frequency or a different reconstruction angle. The result is an applied diffractive passport photograph all areas of which are diffractive, which makes unauthorized adjustment, for instance by printing a photograph on an applied diffractive surface, impossible.

To further increase security against fraud, the homogeneous diffractive grid of the hot embossing film can contain additional hard-to-imitate security features, such as hidden information which can be verified by laser or lenticular information, blazed grids and other machine-readable information.

As already mentioned, the homogeneous diffractive grid of the hot embossing film 3 can also be a "diffractive zero order" grid which does not exhibit the "rainbow effect" typical for surface hologram grids, but a defined change in color when the angle of observation is changed, similar to that of optically variable inks (OVIs). Diffractive "zero order" grids are much more difficult to fake than common diffractive grids with "rainbow effect" and further increase security against fraud if they are present in parts of the diffractive passport photograph.

After application on the document, the document surface is sealed with a scratch resistant protective layer for increasing durability.

As compared to the individualized volume hologram film overlay method, the method according to the invention provides for an inexpensive alternative and is equal to it in qualitative rendering of the passport photograph. Since the individual diffractive data are produced directly on the document, a time-consuming comparison of data from the document and prior to the application of the individualized hot embossing film is not necessary.

LIST OF REFERENCE NUMBERS 1. document
2. 2, 2*a*, 2*b*, 2*c* passport photograph
3. 3, 3*b*, 3*c* hot embossing film with no adhesive coating
4. backing film
5. peel-off film
6. 6, 6*a*, 6*b*, 6*c* decorative layer
7. film residues
8. toner
9. adhesive film

The invention claimed is:

1. A method of hot laminating a hot embossing film, comprising printing an adhesive in the form of symbols, patterns, numbers on a substrate;

hot laminating a diffractive hot embossing film, consisting of backing film, peel-off layer and decorative layer, onto the printed substrate and then removing the backing film;

wherein the substrate is a personal document on which personal data, in particular a passport photograph, is printed with digital printing technology methods, the adhesive being a toner or a dye which develops adhesive characteristics at lamination temperatures;

wherein the diffractive hot embossing film is without an adhesive coating and is hot-laminated onto the printed personal document and the backing film is again removed; and wherein an adhesive film with an adhesive force <10 N/cm is rolled over the substrate surface for removing non-bonded film residues.

2. The method according to claim 1, wherein the toner or dye develops adhesive characteristics in the temperature range from 110-150° C.

3. The method according to claim 1, wherein the personal data and the passport photograph are printed on the document with the thermal transfer or laser printing method with monochrome or transparent toner and a resolution of >/=200 dpi.

4. The method according to claim 1, wherein the decorative layer of the diffractive hot embossing film is metalized or coated with a highly diffractive transparent dielectric.

5. The method according to claim 1, wherein the peel-off layer of the hot embossing film has a separation force of <12 N.

6. The method according to claim 1, wherein a diffractive hot embossing film is used whose decorative layer has a homogeneous grid in at least one position.

7. The method according to claim 6, wherein there is additional holographic, hidden, machine-readable information with the homogeneous diffractive grid.

8. The method according to claim 1, wherein the first printing/application and adhesive film rolling process can be followed by further printing and application and adhesive film rolling processes using other printing data sets and other hot embossing films with differentiated holographic grids.

9. The method according to claim 1, wherein at least one portion of one of the diffractive hot embossing films employed has a "zero order" grid.

10. The method according to claim 1, wherein the passport photograph is printed in an inverted form.

* * * * *